(12) United States Patent
Hunt et al.

(10) Patent No.: US 11,804,898 B2
(45) Date of Patent: *Oct. 31, 2023

(54) USE OF WAVEGUIDES AND LENSES TO IMPROVE LIGHT COMMUNICATION RECEPTION IN DEVICES

(71) Applicant: Telefonaktiebolaget LM Ericsson (publ), Stockholm (SE)

(72) Inventors: Alexander Hunt, Tygelsjö (SE); Andreas Kristensson, Södra Sandby (SE); Magnus L. Disson, Klagshamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,484

(22) Filed: May 12, 2022

(65) Prior Publication Data

US 2022/0271835 A1    Aug. 25, 2022

Related U.S. Application Data

(63) Continuation of application No. 16/351,918, filed on Mar. 13, 2019, now Pat. No. 11,349,567.

(51) Int. Cl.
*H04B 10/116* (2013.01)
*G01J 1/04* (2006.01)
(Continued)

(52) U.S. Cl.
CPC .......... *H04B 10/116* (2013.01); *G01J 1/0474* (2013.01); *G01J 1/42* (2013.01); *G02B 6/42* (2013.01); *G02B 6/4203* (2013.01)

(58) Field of Classification Search
CPC . H04B 10/116; H04B 10/114; H04B 10/1143; H04B 10/80; H04B 10/801;
(Continued)

(56) References Cited

U.S. PATENT DOCUMENTS

| | | | |
|---|---|---|---|
| 4,001,577 | A | 1/1977 | Albanese et al. |
| 6,885,792 | B2 | 4/2005 | Eggleton et al. |

(Continued)

FOREIGN PATENT DOCUMENTS

| | | |
|---|---|---|
| CN | 102257314 A | 11/2011 |
| CN | 106941779 A | 7/2017 |

(Continued)

*Primary Examiner* — John R Lee
(74) *Attorney, Agent, or Firm* — COATS & BENNETT, PLLC

(57) ABSTRACT

A detection system for light communications comprises a total internal reflection (TIR) waveguide and a light sensor adjacent to the TIR waveguide. The TIR waveguide comprises a TIR structure, a diffusive element, and a waveguide entrance. The TIR structure is configured to internally propagate light associated with optical signaling along the TIR waveguide. The diffusive element is disposed at an internal edge of the TIR structure opposite the light sensor. The diffusive element is configured to disrupt the propagation of the light such that at least some of the light is directed to the light sensor. The waveguide entrance is offset from the diffusive element along the TIR structure and configured to collect the light into the TIR structure.

20 Claims, 8 Drawing Sheets

(51) Int. Cl.
*G02B 6/42* (2006.01)
*G01J 1/42* (2006.01)

(58) Field of Classification Search
CPC ........ H04B 10/803; G01J 1/0474; G01J 1/42; G02B 6/42; G02B 6/4203; G02B 6/4206; G02B 6/4214; H04J 14/0213; H04J 14/0201; H04J 14/02
See application file for complete search history.

(56) References Cited

U.S. PATENT DOCUMENTS

| | | | |
|---|---|---|---|
| 7,538,945 B2 | 5/2009 | Hikichi et al. | |
| 7,636,522 B2 | 12/2009 | Nagarajan et al. | |
| 8,594,503 B2 | 11/2013 | Roelkens et al. | |
| 8,676,005 B2 | 3/2014 | Yagi et al. | |
| 9,638,591 B1 | 5/2017 | Sarcia | |
| 9,766,123 B2 | 9/2017 | Brueck et al. | |
| 10,895,701 B1* | 1/2021 | Olsson | G02B 6/4287 |
| 10,958,340 B2* | 3/2021 | Hunt | H04B 10/116 |
| 11,349,567 B2* | 5/2022 | Hunt | H04B 10/116 |
| 2002/0164120 A1 | 11/2002 | Perner | |
| 2003/0235370 A1 | 12/2003 | Taillaert et al. | |
| 2010/0098439 A1 | 4/2010 | Shin et al. | |
| 2013/0163089 A1 | 6/2013 | Bohn | |
| 2014/0086586 A1 | 3/2014 | Voutilainen et al. | |
| 2014/0270758 A1 | 9/2014 | Nejadmalayeri et al. | |
| 2015/0070327 A1 | 3/2015 | Hsieh et al. | |
| 2015/0195044 A1 | 7/2015 | Nejadmalayeri et al. | |
| 2015/0331545 A1 | 11/2015 | Wassvik et al. | |
| 2015/0341115 A1 | 11/2015 | Ke et al. | |
| 2016/0070065 A1 | 3/2016 | Qi et al. | |
| 2016/0097890 A1 | 4/2016 | Vasylyev | |
| 2017/0108375 A1 | 4/2017 | Brueck et al. | |
| 2017/0248734 A1 | 8/2017 | Barfoot et al. | |
| 2018/0100959 A1 | 4/2018 | Vasylyev | |
| 2018/0176739 A1 | 6/2018 | Zhang et al. | |
| 2018/0205457 A1 | 7/2018 | Scheim et al. | |
| 2018/0302158 A1 | 10/2018 | Norval | |
| 2018/0302159 A1 | 10/2018 | Ritchie | |
| 2019/0041634 A1 | 2/2019 | Popovich et al. | |
| 2019/0056591 A1 | 2/2019 | Tervo et al. | |
| 2019/0114484 A1 | 4/2019 | Keech et al. | |
| 2019/0182441 A1 | 6/2019 | Saleh et al. | |
| 2019/0235252 A1 | 8/2019 | Freedman et al. | |
| 2020/0295828 A1 | 9/2020 | Hunt et al. | |
| 2020/0358528 A1* | 11/2020 | Hunt | H04B 10/801 |
| 2020/0363595 A1 | 11/2020 | Grann et al. | |
| 2022/0271835 A1* | 8/2022 | Hunt | G02B 6/4287 |
| 2023/0003951 A1* | 1/2023 | Olsson | G02B 6/4287 |

FOREIGN PATENT DOCUMENTS

| | | |
|---|---|---|
| CN | 109239838 A | 1/2019 |
| DE | 10160233 A1 | 6/2003 |
| WO | 2017134412 A1 | 8/2017 |
| WO | 2017197013 A1 | 11/2017 |
| WO | 2018115837 A1 | 6/2018 |
| WO | 2018130850 A1 | 7/2018 |

* cited by examiner

USE OF WAVEGUIDES AND LENSES TO IMPROVE LIGHT COMMUNICATION RECEPTION IN DEVICES

RELATED APPLICATIONS

This application is a continuation of prior U.S. application Ser. No. 16/351,918, filed 13 Mar. 2019, the entire disclosure of which is hereby incorporated by reference herein.

BACKGROUND

WiFi is a wireless technology that uses electromagnetic waves to wirelessly connect multiple devices within a particular area to each other and/or to connect one or more wireless devices within a particular area to the internet. While WiFi has been incredibly useful and popular in recent years, it is expected that the need for more bandwidth will soon lead to replacing WiFi or complementing WiFi with alternative wireless technologies.

Light Fidelity (LiFi), which uses light within certain wavelength ranges for the local area wireless communications, represents one alternative wireless technology that may replace or complement WiFi. LiFi systems rely on visible, infrared, and/or near ultraviolet spectrum waves. By modulating a light source, e.g., a light emitting diode, a LiFi transmitter transmits high speed signals detectable by a photodetector. The photodetector converts the detected light to electrical current, which is further processed by the receiver to interpret the detected light.

The visible light spectrum is 10,000 times larger than the radio frequency spectrum. LiFi is therefore expected to increase the bandwidth achievable by WiFi alone by a factor of 100. Further, LiFi tends to be more suitable in high density and/or high interference environments, e.g., airplanes, office buildings, hospitals, power plants, etc. Thus, considerable focus has recently been given to improving LiFi technology and/or adapting LiFi technology for specific applications and/or devices.

SUMMARY

The solution presented herein uses waveguides to efficiently collect light used for light communications and propagate that collected light to a sensor. In so doing, the solution presented herein increases the amount of light available for light communications, even when the light associated with the light communications enters the device at an angle. Further, because multiple waveguides may channel light from multiple collection points to a single sensor, the solution presented herein reduces the number of sensors needed for the light communications. The waveguide solution presented herein may be implemented inside a device and/or along an exterior surface, e.g., housing or casing, of a device. As such, the solution presented herein also enables the implementation of light communications for a wide variety of devices (e.g., cellular telephones, tablets, smartphones, smart watches, smart glasses, etc.) and/or in a wide variety of scenarios.

One exemplary embodiment comprises a detection system for light communications. The detection system comprises a total internal reflection (TIR) waveguide and a light sensor. The TIR waveguide comprises a first structure, a diffusive element, and one or more waveguide entrances. The first structure has a first index of refraction, where a second index of refraction adjacent the first structure is less than the first index of refraction such that light input to the TIR waveguide propagates along the TIR waveguide within the first structure. The diffusive element is disposed along an internal edge of the first structure at a first location of the TIR waveguide. The diffusive element is configured to disrupt the propagation of the light along the TIR waveguide. The waveguide entrance(s) comprise one or more waveguide entrances, each at a corresponding second location. Each of the second locations is offset along the TIR waveguide from the first location. Each of the one or more waveguide entrances is configured to collect light associated with the light communications and input the collected light to the first structure at the corresponding second location. The light sensor is disposed adjacent an edge of the first structure opposite the first location and is spaced from the diffusive element by a thickness of the first structure. The light sensor is configured to detect the disrupted light. In some exemplary embodiments, the detection system is part of a portable device configured to be worn by a user, e.g., sunglasses, hearing aid, watch, etc., and/or carried by a user, e.g., a portable telephone, tablet, etc.

One exemplary embodiment comprises a method of detecting light associated with light communications. The method comprises collecting light configured for the light communications via one or more waveguide entrances disposed at different first locations along a total internal reflection (TIR) waveguide. The TIR waveguide comprises a first structure having a first index of refraction, where a second index of refraction adjacent the first structure is less than the first index of refraction such that light entering the TIR waveguide propagates along the TIR waveguide within the first structure. The method further comprises disrupting the propagation of the light along the TIR waveguide using a diffusive element disposed along an internal edge of the first structure at a second location of the TIR waveguide. The second location is offset along the TIR waveguide from each of the one or more first locations. The method further comprises detecting the disrupted light using a light sensor disposed adjacent an edge of the first structure opposite the second location and spaced from the diffusive element by a thickness of the first structure.

One exemplary embodiment comprises a portable device configured to be worn and/or carried by a user. The portable device comprises a detection system for light communications, which comprises a total internal reflection (TIR) waveguide and a light sensor. The TIR waveguide comprises a first structure, a diffusive element, and one or more waveguide entrances. The first structure has a first index of refraction, where a second index of refraction adjacent the first structure is less than the first index of refraction such that light input to the TIR waveguide propagates along the TIR waveguide within the first structure. The diffusive element is disposed along an internal edge of the first structure at a first location of the TIR waveguide. The diffusive element is configured to disrupt the propagation of the light along the TIR waveguide. The waveguide entrance(s) comprise one or more waveguide entrances, each at a corresponding second location. Each of the second locations is offset along the TIR waveguide from the first location. Each of the one or more waveguide entrances is configured to collect light associated with the light communications and input the collected light to the first structure at the corresponding second location. The light sensor is disposed adjacent an edge of the first structure opposite the first location and is spaced from the diffusive element by a thickness of the first structure. The light sensor is configured to detect the disrupted light.

According to exemplary embodiments, the detected light is processed according to any known means to determine the information transmitted in the light collected by the detection system, and to convey that information (when appropriate) to a user.

DETAILED DESCRIPTION

The use of light communications, e.g., LiFi, with WiFi or as a replacement for WiFi, has expanded the capabilities of local area wireless communications. However, the devices typically preferable for such communications are small, and have limited space available for the detectors/receivers used for such communications. Further, the space available in these devices continues to decrease due to the continual reduction in size of these devices and/or the continual addition of new features and/or hardware into these devices. For example, wearable devices (e.g., glasses, watches, etc.) are designed to have a minimal size to improve their wearability (e.g., make them lighter, more comfortable, etc.). The limited physical size of many devices, especially when combined with all the functionality intended to be included in such devices, places limitations on the location and/or size and/or number of light sensors that may be included in the device for light communications.

Conventional solutions require a sensor for every light capturing/entrance location of a device. For example, a device that implements light communications may include three openings in a housing of the device, where such openings are intended to, or could be used to, receive external light associated with light communications. In a conventional solution, such a device necessarily includes three sensors, one sensor disposed beneath each of the three openings, to capture the light entering each opening. Because many devices have limited space available for such sensors, such conventional solutions severely limit the number of sensors available for light communications, and thus limit the amount of light that can be collected for light communications and/or the effectiveness of light communications. Further, conventional solutions generally have challenging mechanical requirements regarding the location of the sensor and/or alignment of a sensor with the corresponding opening in order to enable the sensor to capture as much of the light entering the opening as possible. These mechanical limitations may severely limit the location options for the openings.

The solution presented herein solves many problems associated with conventional solutions by using waveguides to channel light from one or more openings to a sensor. In so doing, the solution presented herein reduces the number of sensors used for light communications, enables each sensor to capture more light associated with the light communications, and/or enables flexibility regarding the sensor size, the sensor location in the device, and/or the alignment of the sensor with any particular opening. In particular, the solution presented herein enables any number of openings to be placed anywhere on the device, while also enabling one or more sensors to be placed at any suitable location within the device, which improves the signal quality and reduces the mechanical constraints associated with LiFi.

Figure 1:
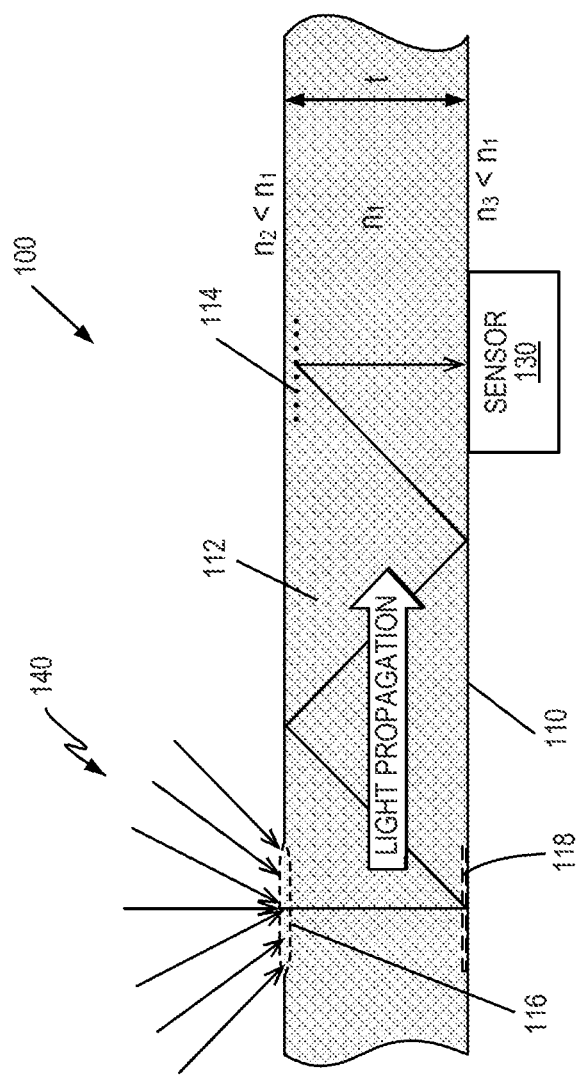
FIG. 1 shows an exemplary waveguide-based light detection system according to exemplary embodiments of the solution presented herein.

FIG. 1 shows one exemplary light detection system 100 for light communications according to embodiments of the solution presented herein. The light detection system 100 comprises a waveguide 110 and a light sensor 130. The waveguide 110 comprises a Total Internal Reflection (TIR) structure 112 through which light propagates, a diffusive element 114, and one or more waveguide entrances 116. The TIR structure 112 has a first index of refraction, where indices of refraction, e.g., $n_2$ and/or $n_3$, surrounding/adjacent to the TIR structure 112 is/are less than the first index of refraction $n_1$ such that light input to the waveguide 110 propagates along the waveguide 110 within the TIR structure 112. Diffusive element 114 is disposed along an internal edge of the TIR structure 112 at a predetermined location of the waveguide 110 to disrupt the propagation of the light along the TIR structure 112. Each of the waveguide entrance(s) 116 is at a location laterally offset along the waveguide 110 from the location of the diffusive element 114, where each waveguide entrance 116 collects light 140 associated with the light communications and inputs the collected light 140 to the TIR structure 112 at the corresponding input location. The light sensor 130 comprises, for example, a Photo Sensitive Receptor (PSR) configured to detect the light disrupted by the diffusive element 114. To that end, light sensor 130 is disposed adjacent to an internal edge of the TIR structure 112 opposite the location of the diffusive element 114 and generally spaced from the diffusive element by a thickness t of the TIR structure 112 so that the light sensor 130 detects light disrupted by the diffusive element 114.

The propagation of the light through the TIR structure 112 is at least partially controlled by the index of refraction $n_1$ of the TIR structure 112 relative to the surrounding index/indices of refraction. When material(s) surrounding the TIR structure 112 have a lower refractive index than the TIR structure 112, the TIR structure 112 functions as a TIR layer, which enables the light entering the TIR structure 112 at a TIR angle to propagate along the TIR structure 112 with total internal reflection, and thus with minimal to no loss. While in some embodiments the indices of refraction surrounding the TIR structure 112 are all the same, the solution presented herein does not require the index/indices of refraction surrounding the TIR structure 112 to be equal. Instead the solution presented herein only requires that the index of refraction $n_1$ of the TIR structure 112 be greater than each index of refraction of the surrounding material so that light input into the TIR structure 112 propagates along the TIR structure 112 with total internal reflection.

The desired index of refraction relationship between the TIR structure 112 and the surrounding structure(s)/material(s) may be achieved in any number of ways. For example, when the TIR structure 112 is a cylindrical tube having a first index of refraction $n_1$, having a second index of refraction $n_2$ surrounding the tube less than the first index of refraction ($n_2 < n_1$) causes the desired total internal reflection in the TIR structure 112. In another example, when the TIR structure 112 is a right rectangular prism having the first index of refraction $n_1$, having a second index of refraction $n_2$ on one side of the TIR structure 112 that is less than the first index of refraction ($n_2 < n_1$), and a third index of refraction $n_3$ on an opposing side of the TIR structure 112 that is also less than the first index of refraction ($n_3 < n_1$), as shown in FIG. 1, causes total internal reflection in the TIR structure 112. In another example, waveguide 110 may be realized using a set of coatings or layers, where each layer/coating represents a different part of the waveguide 110. In this example, one layer may represent a TIR layer (i.e., the TIR structure 112), while one or more layers surrounding the TIR layer has a lower index of refraction than that of the TIR layer, and thus represents a "reflective" layer. Such a reflective layer may also serve as a protective layer that protects the TIR structure 112 from scratches, debris, and/or other foreign objects. Alternatively, a protective layer separate from the reflective layer may be applied between the TIR structure 112 and the reflective layer, where the protective layer has the same or lower index of refraction as the reflective layer. The protective layer may also be used to add print (e.g., text, images, etc.) that when visible to a user of the device 200 identify any desired information related to or about the device 200, e.g., brand name, model name/number, team affiliations, school affiliations, etc.

The diffusive element 114 comprises any material or structure that disrupts the propagation of the light within the TIR structure 112. In some embodiments, the diffusive element 114 may direct the disrupted light to the sensor 130. In other embodiments, the diffusive element 114 may scatter the light such that at least some of the originally propagating light is captured by the sensor 130. In one exemplary embodiment, the diffusive element 114 comprises white or colored paint applied to the inner edge of the TIR structure 112 above the sensor 130. In another exemplary embodiment, the diffusive element 114 is constructed by altering the material at the location of diffusive element 114 so that this location of the TIR structure 112 is no longer flat and/or smooth. For example, machined dots may be placed at the location of the diffusive area 114 or the location of the diffusive area 114 may be etched or roughened.

The waveguide entrance 116 comprise an opening in the housing of a device 200 configured to collect light 140, e.g., associated with light communications, and input the collected light to the TIR structure 112 of the waveguide 110. Each waveguide entrance 116 is laterally offset from the location of the diffusive element 114/sensor 130, where light 140 collected at one entrance propagates along the waveguide 110 to get to the sensor 130. In some embodiments, the waveguide entrances 116 may comprise just the openings. In other embodiments, the waveguide entrances 116 may include a collection element 124, e.g., a lens or lens system (e.g., FIG. 2), where the collection element 124 is configured to increase the amount of external light 140 that is input into the waveguide 110. When the waveguide entrance 116 includes a collection element 124, generally the collection element 124 will have a wide Field of View (FoV) to increase the amount of collected light. Exemplary lenses include, but are not limited to a Fresnel lens 124a (FIG. 4), a plano-convex lens 124b (FIG. 4), etc. It will be appreciated that the use of any collection element 124 in one or more waveguide entrances 116 is optional.

Figure 2:
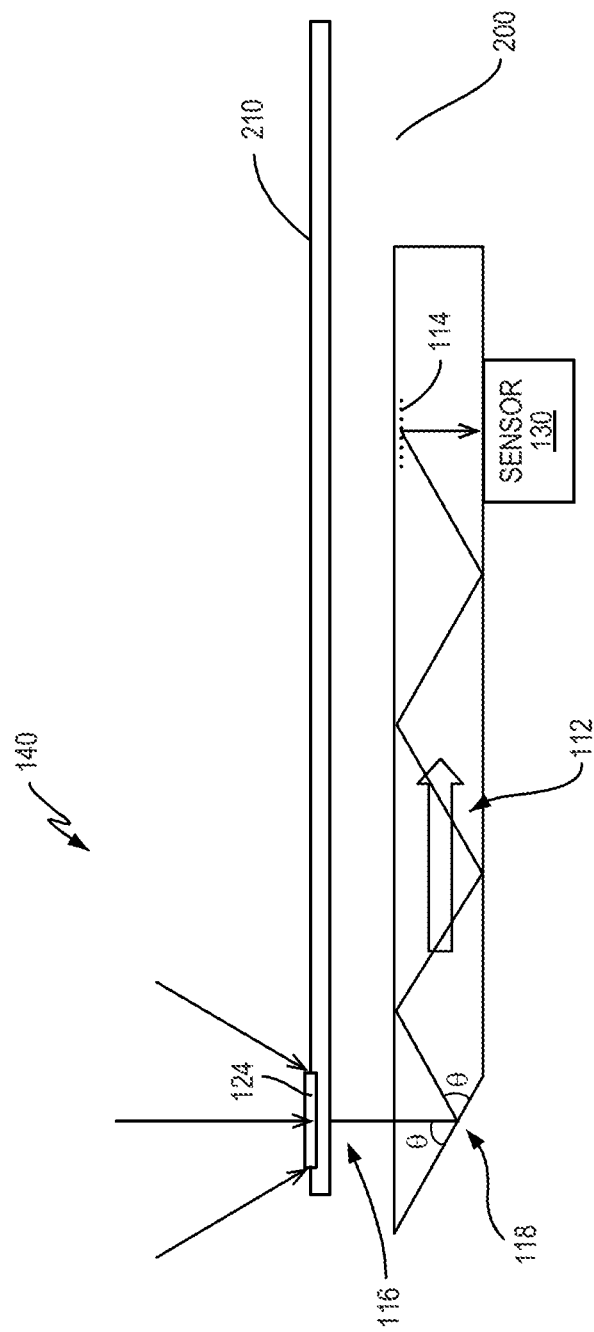
FIG. 2 shows an exemplary waveguide-based light detection system according to further exemplary embodiments of the solution presented herein.

The waveguide 110 may further comprise a light guiding element 118 opposite a corresponding waveguide entrance 116 that is configured to facilitate the propagation of the collected light from the waveguide entrance 116 along the TIR structure 112. In one exemplary embodiment, the light guiding element 118 comprises a reflector configured to reflect the light collected by the corresponding waveguide entrance 116 at a total internal reflection angle to facilitate the propagation of the collected light along the TIR structure 112. One exemplary reflector includes an angled mirror 118, as shown in FIG. 2, which reflects the incident light at an angle θ equivalent to the entry angle θ. To implement the total internal reflection, this angle θ may be equivalent to the total internal reflection angle for the waveguide 110. Additional reflectors include, but are not limited to, a plurality of etched surfaces, as shown in FIG. 4, mirror print or a material with a lower refractive index so that the angle θ of the light exiting the light guiding element 118 is the same as the angle of incidence on the light guiding element 118, etc. In another exemplary embodiment, the light guiding element 118 comprises a bend proximate the corresponding waveguide entrance 116, e.g., as shown in FIG. 3, where the bend is configured to direct the collected light at the total internal reflection angle to facilitate the propagation of the collected light along the TIR structure 112.

Figure 3:
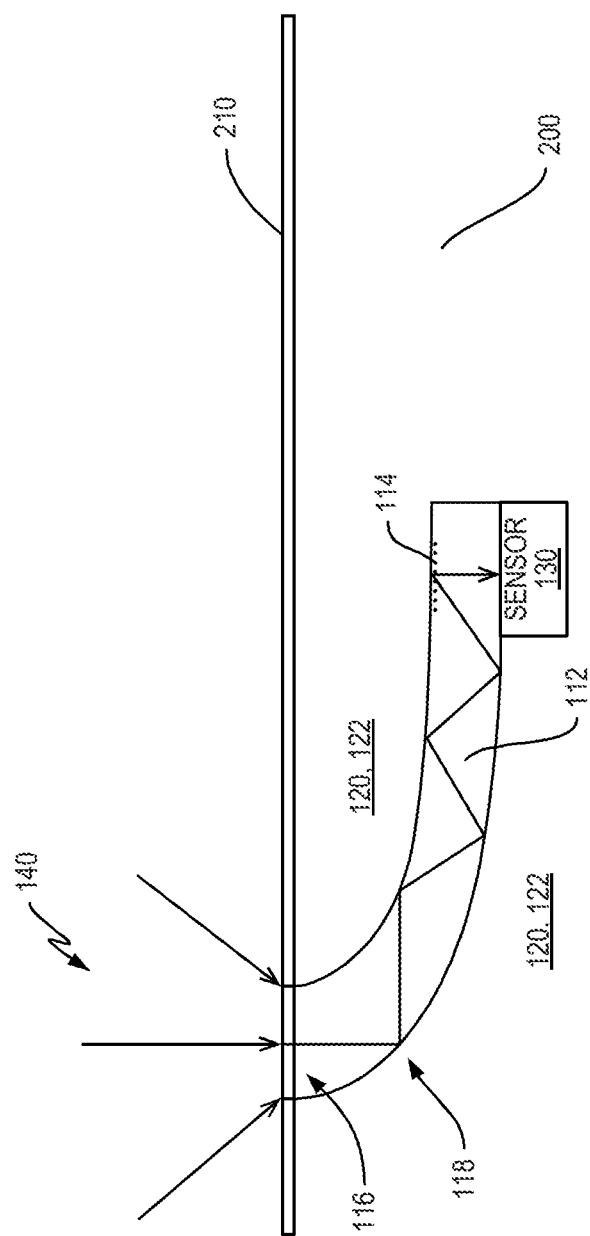
FIG. 3 shows an exemplary waveguide-based light detection system according to further exemplary embodiments of the solution presented herein.
Figure 4:
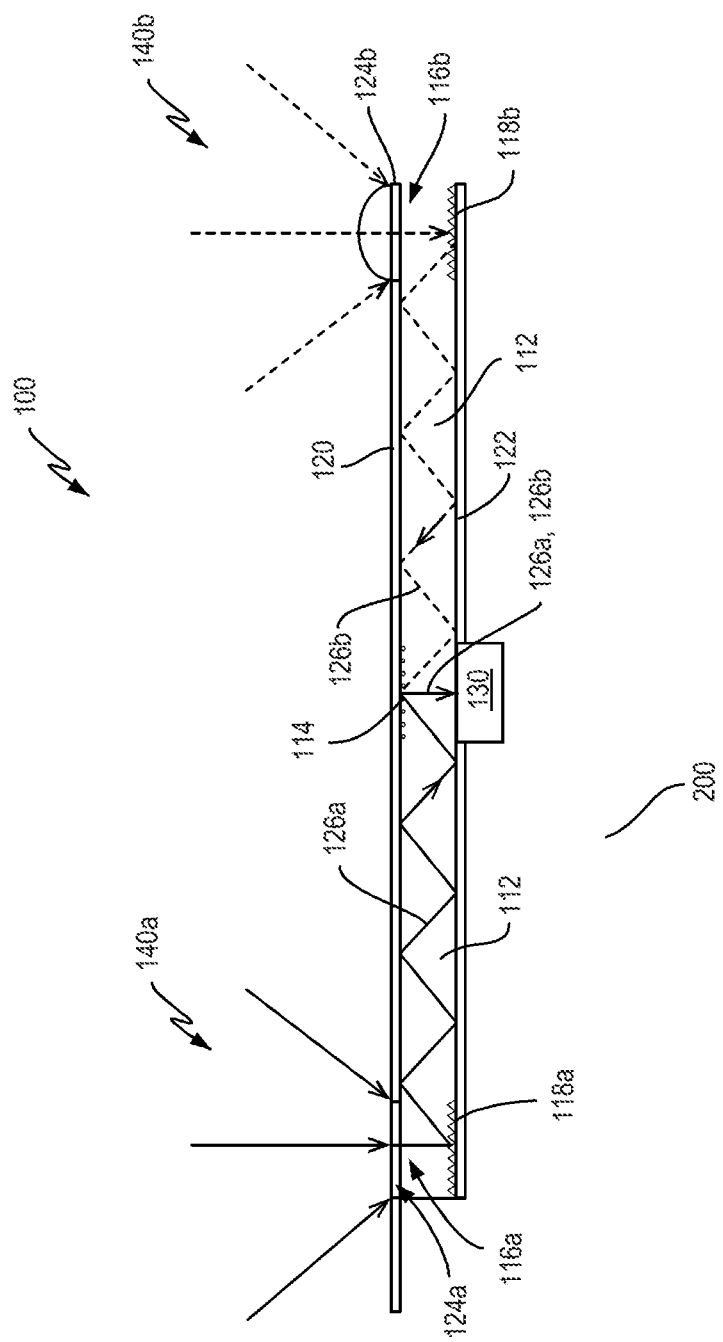
FIG. 4 shows an exemplary waveguide-based light detection system according to further exemplary embodiments of the solution presented herein.

The exemplary light detection systems 100 of FIGS. 1-3 show a single waveguide entrance 116 providing light to a single sensor 130. The solution presented herein, however is not so limited. Alternative embodiments may include multiple waveguide entrances 116 that collect light for propagation along one or more corresponding waveguides 110 to the sensor 130. In some embodiments, multiple waveguide entrances 116 use the same waveguide 110 to propagate the light to a single sensor 130. In other embodiments, multiple waveguides 110 propagate light from one or more waveguide entrances 116 to a single sensor 130. In addition, the location of one or more waveguide entrances 116 relative to the sensor may be selected to reduce noise and/or increase the signal strength. For example, the lateral spacing between multiple waveguide entrances 116 and the corresponding sensor 130 may be configured such that the light entering the sensor 130 adds constructively. Alternatively or additionally, the lateral spacing between multiple waveguide entrances 116 and the corresponding sensor 130 may be configured such that interference present in the collected light adds destructively or neutrally.

Figure 5:
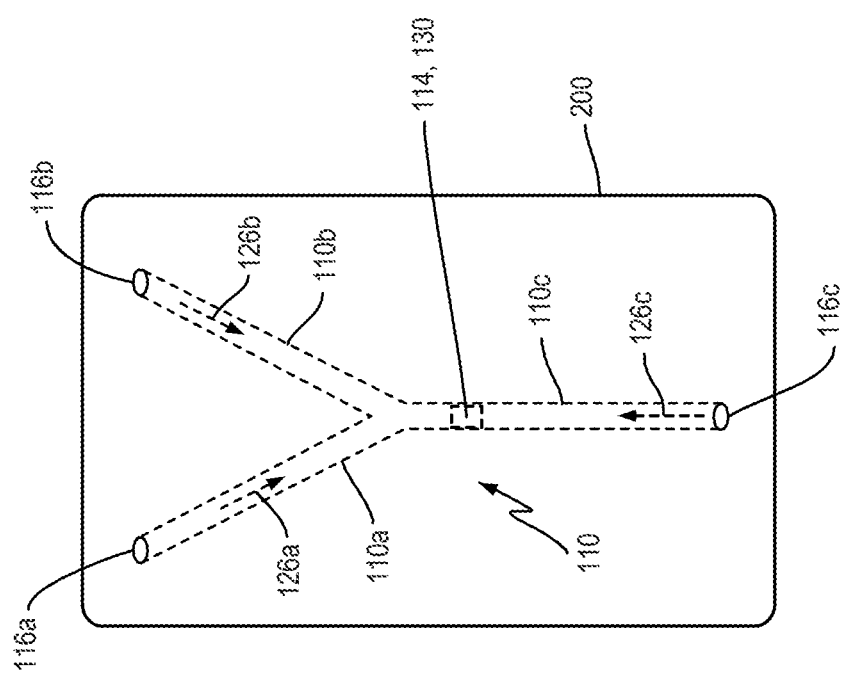
FIG. 5 shows an exemplary waveguide-based light detection system according to further exemplary embodiments of the solution presented herein.

FIGS. 4-5 show exemplary embodiments with multiple waveguide entrances 116 channeling light to a single sensor 130. As shown in FIG. 4, light sensor 130 may detect light originating from multiple waveguide entrances 116, e.g., a first waveguide entrance 116a and a second waveguide entrance 116b located on opposing sides of the TIR waveguide 110 from the light sensor 130. In this exemplary embodiment, waveguide entrance 116a and lens 124a collects light 140a, light guiding element 118a establishes the TIR angle for the collected light to propagate 126a the collected light along the TIR structure 112 towards the sensor 130 in a first direction. Further, waveguide entrance 116b and lens 124b collects light 140b, light guiding element 118b establishes the TIR angle for the collected light to propagate 126b the collected light along the TIR structure 112 towards the sensor 130 in a second direction opposite the first direction. The diffusive element 114 disrupts the propagation 126a, 126b, from both directions, of the light collected by the waveguide entrances 116a, 116b for detection by sensor 130.

In FIG. 5, light sensor 130 detects light originating from three waveguide entrances: 116a, 116b, 116c. In this exemplary embodiment, TIR waveguide 110 comprises multiple legs 110a, 110b, 110c, each of which respective propagate 126a, 126n, 126v light in different directions from the corresponding entrance 116a, 116b, 116a towards the light sensor 130, where the diffusive element 114 disrupts the propagating light to enable detection by the light sensor 130. It will be appreciated that the multiple legs 110a, 110b, 110c of FIG. 5 may represent different waveguides 110 that collectively channel collected light to a single sensor 130.

While FIGS. 1-5 show exemplary detection systems 100 having only one sensor 130, it will be appreciated that the detection system 100 disclosed herein may include more than one sensor 130. Further, while FIGS. 1-5 show exemplary detection systems 100 having 1-3 waveguide entrances 116, it will be appreciated that the detection system 100 disclosed herein may include any number of waveguide entrances 116. In general, detection system 100 may comprise any number of waveguide entrances 116 and/or waveguides 110, where each entrance 116 is located at a location of the waveguide 110 laterally displaced from the sensor 130 and diffusive element 114, such that light communications are implemented using fewer sensors 130 than waveguide entrances 116 and/or waveguides 110. In so doing, the solution presented herein reduces the number of sensors 130 associated with light communications, while simultaneously improving the quality of the light communications, e.g., by increasing the amplitude of the detected light. Further, by using waveguides to direct the light from multiple entrances 116 to the sensor(s) 130, the solution presented herein relaxes limitations previously placed on the sensor(s) 130, e.g., the size, power, etc., because the sensor(s) 130 may now be placed at any suitable location in the device 200.

Figure 6:
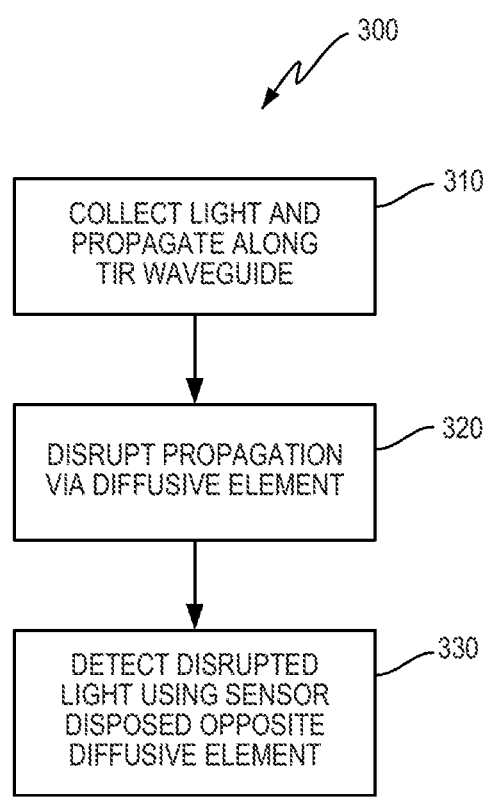
FIG. 6 shows an exemplary method for detecting light for light communications according to exemplary embodiments of the solution presented herein.

FIG. 6 shows an exemplary method 300 of detecting light associated with light communications. The method comprises collecting (block 310) light configured for the light communications via one or more waveguide entrances 116 disposed at different first locations along a total internal reflection TIR waveguide 110 (block 310). The TIR waveguide 110 comprises a TIR structure 112 having a first index of refraction $n_1$, where a second index of refraction $n_2$ and/or $n_3$ adjacent the TIR structure 112 is less than the first index of refraction $n_1$ such that light entering the TIR waveguide 110 propagates along the TIR structure 112. The method further comprises disrupting the propagation of the light along the TIR waveguide 110 using a diffusive element 114 disposed along an internal edge of the TIR structure 112 at a second location of the TIR waveguide 110 (block 320). The second location is offset (laterally) along the TIR waveguide 110 from each of the one or more first locations. The method further comprises detecting the disrupted light using a light sensor 130 disposed adjacent an edge of the TIR structure 112 opposite the second location and spaced from the diffusive element 114 by a thickness t of the TIR structure 112 (block 330).

As mentioned above, the light detection system 100 of the solution presented herein may be implemented in and/or as part of any number of wireless devices 200 that implement light communications. Exemplary devices 200 may be worn and/or carried by a user, where the light detection system 100 disclosed herein may be internal to a housing of a device 200, disposed partially internally to the device 200 and partially integrated with/disposed on the housing of the device, or implemented on an external surface of the housing of the device 200.

Figure 7A:
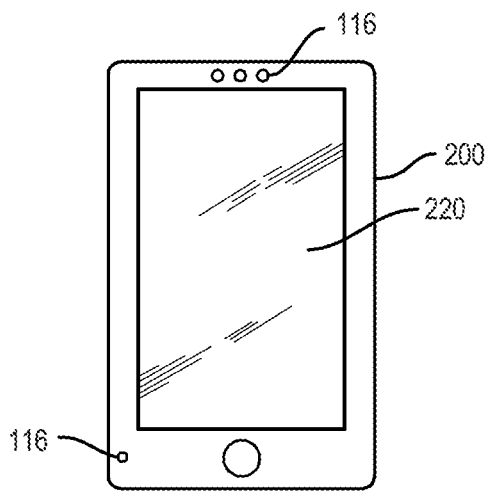
FIGS. 7A-7C show an exemplary device comprising the light detection system according to exemplary embodiments of the solution presented herein.
Figure 7B:
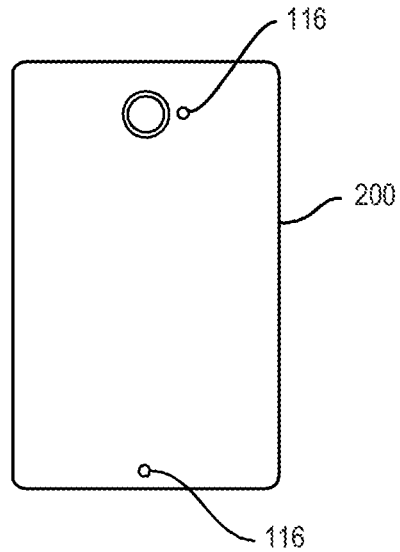
Figure 7C:
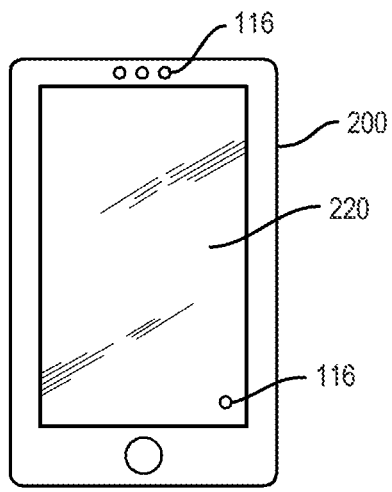

FIGS. 7A-7C show an exemplary smart phone device 200. Smart phone device 200 may comprise waveguide entrances 116 around the display 220 along the perimeter of the housing 210, as shown in FIGS. 7A and 7C. Alternatively or additionally, device 200 may comprise waveguide entrances on a back of the smart phone device 200, as shown in FIG. 7B, and/or integrated with the display 220, as shown in FIG. 7C. It will be appreciated that the integration of waveguide entrance(s) 116 with the display 220 may include placing the waveguide entrance(s) 116 below a transparent type of display 220, e.g., an Active-Matrix Organic Light-Emitting Diode (AMOLED) screen/display. It will further be appreciated that the waveguide solution presented herein enables multiple waveguide entrances 116 to be placed at any suitable location on the smart phone device 200, besides those explicitly shown, while simultaneously enabling a single sensor 130 (or fewer sensors 130 than there are waveguide entrances 116), placed in the device 200 at any location suitable for the sensor 130, to detect the light from the multiple entrances 116, and thus enable the light communications.

Figure 8:
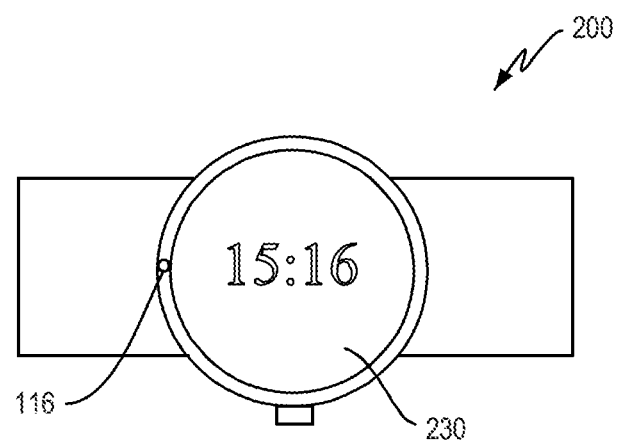
FIG. 8 shows an exemplary device comprising the light detection system according to further exemplary embodiments of the solution presented herein.
Figure 9:
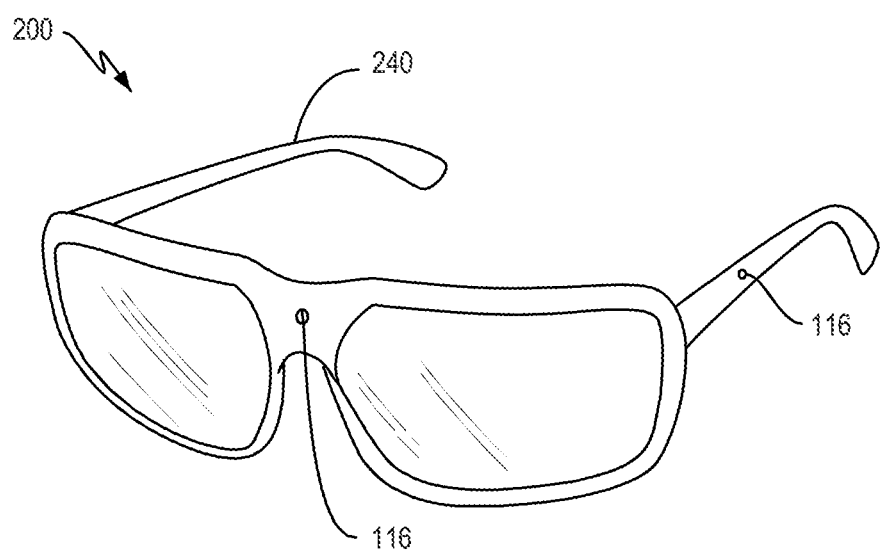
FIG. 9 shows an exemplary device comprising the light detection system according to further exemplary embodiments of the solution presented herein.

In another exemplary embodiment, the device 200 comprises a watch, as shown in FIG. 8. For the watch embodiment, the waveguide entrances 116 may be placed at any suitable location, e.g., around the face 230 of the watch and/or in a bezel of the watch, integrated with the display of the watch (not shown), as part of the face of the watch (not shown), etc. In yet another exemplary embodiment, shown in FIG. 9, the device 200 comprises glasses, where the waveguide entrances 116 are disposed along a frame 240 of the glasses. In addition to the smartphone, watch, and glasses implementations discussed herein, the solution presented herein is also applicable to any wireless devices implementing light communications. For example, other exemplary devices 200 include, but are not limited to, hearing aids, fitness monitors, cellular telephones, laptop computers, tablets, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A detection system for light communications, the detection system comprising:
    a total internal reflection (TIR) waveguide and a light sensor adjacent to the TIR waveguide, the TIR waveguide comprising:
        a TIR structure configured to internally propagate light associated with optical signaling along the TIR waveguide;
        a diffusive element disposed at an internal edge of the TIR structure opposite the light sensor, the diffusive element configured to disrupt the propagation of the light such that at least some of the light is directed to the light sensor; and
        a waveguide entrance offset from the diffusive element along the TIR structure and configured to collect the light into the TIR structure.

2. The detection system of claim 1, wherein:

the TIR waveguide further comprises a first layer having a first index of refraction and a second layer having a second index of refraction;

the TIR structure abuts the first layer and the second layer; and the TIR structure has a third index of refraction that is less than both the first index of refraction and the second index of refraction.

3. The detection system of claim 2, wherein the first layer and the second layer are each configured to be at least partially disposed on an external portion of a device comprising the detection system.

4. The detection system of claim 1, wherein:

the TIR waveguide further comprises a further waveguide entrance offset from the diffusive element along the TIR structure, the waveguide entrance and the further waveguide entrance being offset from the diffusive element in different directions;

the further waveguide entrance is configured to collect further light into the TIR structure;

the TIR structure is further configured to internally propagate the further light along the TIR waveguide towards the diffusive element; and the diffusive element is further configured to disrupt the propagation of the further light such that at least some of the further light is directed to the light sensor.

5. The detection system of claim 4, wherein the different directions are opposite directions.

6. The detection system of claim 4, wherein:

the TIR waveguide further comprises an additional waveguide entrance offset from the diffusive element along the TIR structure;

the waveguide entrance, the further waveguide entrance, and the additional waveguide entrance are offset from the diffusive element in respective directions;

the additional waveguide entrance is configured to collect additional light into the TIR structure;

the TIR structure is further configured to internally propagate the additional light along the TIR waveguide towards the diffusive element; and the diffusive element is further configured to disrupt the propagation of the additional light such that at least some of the additional light is directed to the light sensor.

7. The detection system of claim 1, wherein the waveguide entrance comprises a lens configured to collect the light.

8. The detection system of claim 1, wherein diffusive element is separated from the light sensor by a thickness of the TIR structure.

9. The detection system of claim 1, wherein the TIR waveguide further comprises a light guiding element disposed along an internal edge of the TIR structure the waveguide entrance, said light guiding element configured to facilitate the propagation of the light collected by the waveguide entrance along the TIR waveguide.

10. The detection system of claim 9, wherein the light guiding element comprises a bend proximate the waveguide entrance, said bend configured to direct the light collected by the waveguide entrance at a TIR angle to facilitate the propagation of the light collected by the waveguide entrance along the TIR waveguide.

11. The detection system of claim 9, wherein the light guiding element comprises a reflector configured to reflect the light collected by the waveguide entrance at a TIR angle to facilitate the propagation of the light collected by the waveguide entrance along the TIR waveguide.

12. The detection system of claim 1, wherein the detection system is configured to be housed within a portable device worn by a user.

13. A method of detecting light associated with light communications, the method comprising:

collecting, at a waveguide entrance of a total internal reflection (TIR) waveguide and into a TIR structure of the TIR waveguide, light configured for the light communications, the waveguide entrance being offset along the TIR structure from a diffusive element of the TIR waveguide, the diffusive element being disposed at an internal edge of the TIR structure opposite a light sensor;

propagating the light collected by the waveguide entrance along the TIR waveguide;

disrupting the propagation of the light along the TIR waveguide at the diffusive element such that at least some of the light is directed to the light sensor.

14. The method of claim 13, further comprising:

collecting further light into the TIR structure at a further waveguide entrance of the TIR waveguide, the waveguide entrance and the further waveguide entrance being offset from the diffusive element in different directions;

propagating the further light along the TIR waveguide towards the diffusive element; and disrupting the propagation of the further light such that at least some of the further light is directed to the light sensor.

15. The method of claim 14, wherein the different directions are opposite directions.

16. The method of claim 14, further comprising:

collecting additional light into the TIR structure at an additional waveguide entrance of the TIR waveguide, wherein the waveguide entrance, the further waveguide entrance, and the additional waveguide entrance are offset from the diffusive element in respective directions;

propagating the additional light along the TIR waveguide towards the diffusive element; and disrupting the propagation of the additional light such that at least some of the additional light is directed to the light sensor.

17. The method of claim 13, wherein collecting the light configured for the light communications comprises collecting the light using a lens of the waveguide entrance.

18. The method of claim 13, further comprising facilitating the propagation of the collected light using a light guiding element disposed along an internal edge of the TIR structure opposite the waveguide entrance.

19. The method of claim 18, wherein facilitating the propagation of the collected light using a light guiding element comprises using a bend proximate the waveguide entrance to direct the light collected by the waveguide entrance at a TIR angle.

20. The method of claim 18, wherein facilitating the propagation of the collected light using a light guiding element comprises using a reflector configured to reflect the light collected by the corresponding waveguide entrance at a TIR angle.

* * * * *

UNITED STATES PATENT AND TRADEMARK OFFICE
CERTIFICATE OF CORRECTION

PATENT NO. : 11,804,898 B2
APPLICATION NO. : 17/742484
DATED : October 31, 2023
INVENTOR(S) : Hunt et al.

Page 1 of 1

It is certified that error appears in the above-identified patent and that said Letters Patent is hereby corrected as shown below:

On the Title Page

In Item (72), under "Inventors", in Column 1, Line 3, delete "Disson," and insert -- Olsson, --, therefor.

In the Specification

In Column 1, Line 31, delete "10,000" and insert -- ~10,000 --, therefor.

In Column 4, Line 31, delete "refraction," and insert -- refraction $n_1$, --, therefor.

Signed and Sealed this
Twenty-third Day of January, 2024

Katherine Kelly Vidal
*Director of the United States Patent and Trademark Office*